(12) United States Patent
Van Leuvenhaege et al.

(10) Patent No.: US 10,265,655 B2
(45) Date of Patent: Apr. 23, 2019

(54) TWO-STEP MEMBRANE SYSTEM WITH EJECTOR

(71) Applicant: UOP LLC, Des Plaines, IL (US)

(72) Inventors: Manu G. R. Van Leuvenhaege, Antwerp (BE); Charles-Yves Janssens, Antwerp (BE)

(*) Notice: Subject to any disclaimer, the term of this patent is extended or adjusted under 35 U.S.C. 154(b) by 0 days.

(21) Appl. No.: 15/600,513

(22) Filed: May 19, 2017

(65) Prior Publication Data
US 2017/0354919 A1 Dec. 14, 2017

Related U.S. Application Data

(60) Provisional application No. 62/348,108, filed on Jun. 9, 2016.

(51) Int. Cl.
*B01D 53/22* (2006.01)
*B32B 27/28* (2006.01)
*B32B 27/36* (2006.01)
*B01D 53/047* (2006.01)

(52) U.S. Cl.
CPC ......... *B01D 53/228* (2013.01); *B01D 53/047* (2013.01); *B01D 53/22* (2013.01); *B01D 53/226* (2013.01); *B32B 27/281* (2013.01); *B32B 27/285* (2013.01); *B32B 27/286* (2013.01); *B32B 27/288* (2013.01); *B32B 27/365* (2013.01); *B01D 2053/221* (2013.01); *B01D 2256/24* (2013.01); *B01D 2256/245* (2013.01);
(Continued)

(58) Field of Classification Search
CPC .... B01D 53/047; B01D 53/22; B01D 53/226; B01D 53/228; B01D 2053/221; B01D 71/12; B01D 71/16; B01D 71/26; B01D 71/50; B01D 71/52; B01D 71/64; B01D 71/68; B01D 2317/02; B01D 2317/022; B32B 27/281; B32B 27/285; B32B 27/286; B32B 27/288; B32B 27/365
See application file for complete search history.

(56) References Cited

U.S. PATENT DOCUMENTS 4,386,944 A * 6/1983 Kimura ............... B01D 53/22
95/51
5,256,295 A 10/1993 Baker et al.
(Continued)

OTHER PUBLICATIONS

Kudinov, "Separation characteristics of an ejector membrane-sorption hybrid system", Theoretical Foundations of Chemical Engineering, vol. 48, Issue 6, Dec. 2, 2014, pp. 832-836.
(Continued)

*Primary Examiner* — Jason M Greene

(57) ABSTRACT

The present invention involves the use of a two-step membrane system for gas separations. In this two-step membrane system, the membrane system comprises high selectivity and high permeance membranes. The two-step membrane system includes a first membrane section, a second membrane section and an ejector configured to increase the pressure of a lower permeate using the energy from a higher permeate gas pressure. The process provides increase in product recovery and product purity of the product gases. It can also save the cost compared to the system using compressors and external energy to drive the separation of gases.

20 Claims, 1 Drawing Sheet

(52) U.S. Cl.
CPC .. *B01D 2257/304* (2013.01); *B01D 2257/504* (2013.01); *Y02C 10/10* (2013.01)

(56) References Cited

U.S. PATENT DOCUMENTS

| | | | |
|---|---|---|---|
| 5,837,034 A * | 11/1998 | Keskar | B01D 53/22 |
| | | | 95/54 |
| 7,803,275 B2 | 9/2010 | Partridge et al. | |
| 9,017,451 B2 | 4/2015 | Wynn et al. | |
| 2007/0114177 A1* | 5/2007 | Sabottke | B01D 53/22 |
| | | | 210/650 |
| 2009/0232861 A1* | 9/2009 | Wright | B01D 53/62 |
| | | | 424/405 |
| 2010/0147148 A1* | 6/2010 | Rabiei | B01D 53/22 |
| | | | 95/247 |
| 2010/0206789 A1* | 8/2010 | Yukumoto | B01D 61/362 |
| | | | 210/96.2 |
| 2013/0255483 A1 | 10/2013 | Sanders et al. | |
| 2013/0341839 A1* | 12/2013 | Grover | B01D 53/22 |
| | | | 266/44 |
| 2014/0020557 A1* | 1/2014 | Zhou | B01D 53/229 |
| | | | 95/51 |
| 2015/0098872 A1 | 4/2015 | Kelly et al. | |
| 2017/0114294 A1* | 4/2017 | Florido | B01D 53/226 |

OTHER PUBLICATIONS

Wernerson, "Supersonic compressors for hydrogen recovery", Hydrocarbon Engineering, vol. 11, Issue 12, Dec. 2006, pp. 47-48.

\* cited by examiner

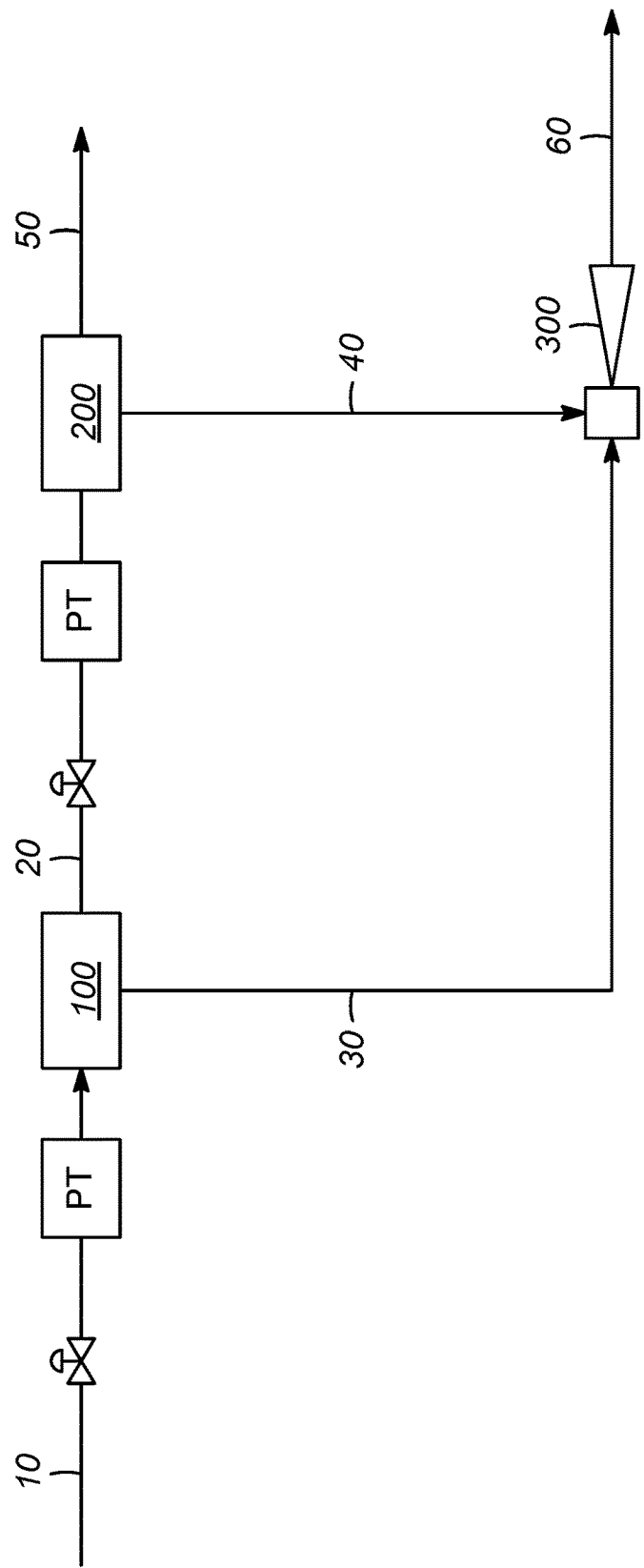

TWO-STEP MEMBRANE SYSTEM WITH EJECTOR

CROSS-REFERENCE TO RELATED APPLICATION

This application claims priority from Provisional Application No. 62/348,108 filed Jun. 9, 2016, the contents of which cited application are hereby incorporated by reference in its entirety.

FIELD

The present invention relates to gas separation methods, for example the separations of gases using a two-step membrane system in series. The present invention specifically relates to a process for separation of gases using an ejector in a two-step, membrane system in series that includes membrane systems run at different permeate gas pressures.

BACKGROUND

Membrane systems are used for separation of gases, liquids from a mixture of gas and liquid streams. Multi-stage membranes are used to increase the product recovery or the product purity for commercial application. Generally, in a two-stage membrane system, the primary or pre-membrane and secondary membranes operate at different pressures. For example, in a conventional two-stage membrane system to recover the useful product, a permeate that passes through the primary membrane will be compressed and then will pass through the secondary membrane. The residue from the secondary membrane is then recycled to the primary membrane. This two-stage membrane configuration can significantly increase the product recovery compared to a one-stage membrane system. The two-stage system can also be used to obtain high purity permeate product. However, the required compressor power is generally high since the permeate from the primary membrane is compressed in this process configuration.

In some two-stage membrane systems, the permeate from the pre-membrane will not be compressed and sent to the secondary membrane, but instead, it will be directly sent to either the waste stream or product stream. Since the selectivity of the pre-membrane unit is very high, the membrane will provide either low product (as retentate) loss, or high purity product (as permeate). Other known methods include using an external energy resource to drive the compression and increase the pressure of the lower permeate stream to enable separation of the gas or liquid mixture streams. It is important to reduce the compression cost and costs involved in using external energy to drive the process of separation while maintaining the level of product recovery in any new configuration. It is further desirable to increase the retentate product recovery and/or permeate product purity without increase compression costs.

SUMMARY

An embodiment of the subject matter is a process for separating a feed comprising a mixture of gases comprising passing the feed to a two-step membrane system to separate the mixture of gases in a first membrane section into a first permeate stream and a first retentate stream. The first retentate stream is passed to a second membrane section within the two-step membrane system to separate the first retentate stream into a second permeate stream and a second retentate stream. The first permeate stream and second permeate stream are passed to an ejector to use a higher permeate gas pressure to increase a lower permeate gas pressure. A combined permeate gas stream is recovered from the ejector. The first membrane section, the second membrane section and the ejector are in series.

Another embodiment of the subject matter is an apparatus for separation of mixture of gases comprising a first membrane section and a second membrane section within the two-step membrane system. The membrane system comprises at least one glassy polymer and wherein a gas mixture is separated into a first retentate stream and a first permeate stream in the first membrane section and into a second retentate stream and a second permeate stream in the second membrane section. The membrane system comprises an ejector configured to increase the pressure of a lower permeate using the energy from a higher permeate gas pressure. The first membrane section, second membrane section and the ejector are in series within the two-step membrane system.

It is an advantage of the subject matter to provide a novel process and apparatus to separate a mixture of gases using internal energy that enables reduced cost. The present subject matter seeks to provide improved processes and apparatuses to address the problems of high utility consumption and increased operating costs of compressors and external energy to drive the separation of gases using membrane systems. The two-step membrane system of the present subject matter can advantageously increase product recovery and product purity for gas separations at reduced interstage compression cost.

Additional objects, advantages and novel features of the examples will be set forth in part in the description which follows, and in part will become apparent to those skilled in the art upon examination of the following description or may be learned by production or operation of the examples. The objects and advantages of the concepts may be realized and attained by means of the methodologies, instrumentalities and combinations particularly pointed out in the appended claims.

BRIEF DESCRIPTION OF THE DRAWING

The FIGURE is a flow scheme for the process and apparatus of the present disclosure. Corresponding reference characters indicate corresponding components throughout the drawing. Skilled artisans will appreciate that elements in the FIGURE are illustrated for simplicity and clarity and have not necessarily been drawn to scale. For example, the dimensions of some of the elements in the FIGURE may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary aspects. The scope of the present disclosure should be determined with reference to the claims.

A general understanding of the process for separating a feed comprising a mixture of gases can be obtained by reference to the FIGURE. The process advantageously enables separation of gases using an ejector in a two-step, membrane system in series. The FIGURE has been simplified by the deletion of a large number of apparatuses customarily employed in a process of this nature, such as vessel internals, temperature and pressure controls systems, flow control valves, recycle pumps, etc. which are not specifically required to illustrate the performance of the subject matter. Furthermore, the illustration of the process of this subject matter in the embodiment of a specific drawing is not intended to limit the subject matter to specific embodiments set out herein.

The present invention involves the use of a two-step membrane system for gas separations. The two-step membrane system has high selectivity and high permeance or at least high selectivity membranes. The invention provides improved processes and apparatuses to address the problems of high utility consumption and increased operating costs of compressors and external energy to drive the separation of gases using membrane systems. The two-step membrane system of the present subject matter can can reduce interstage compression cost, increase product recovery and product purity for gas separations. The both high selectivity and high permeance or at least high selectivity membrane may be made from are substituted or unsubstituted glassy polymers.

The present subject matter, as shown in the FIGURE, includes a two step membrane system for separating a feed comprising a mixture of gases. Many configurations of the present invention are possible, but specific embodiments are presented herein by way of example. The two step membrane system comprises a first membrane section 100 and a second membrane section 200 within the two-step membrane system. A feed comprising a mixture of gases in line 10 is passed to the two step membrane system to separate the mixture of gases. Representative mixture of gas streams include those comprising light hydrocarbons (e.g., C1-C3 hydrocarbons such as methane), and non-hydrocarbon gases, such as carbon dioxide (CO2) and hydrogen sulfide (H2S). The feed in line 10 is passed to the first membrane section 100 of the two-step membrane system to separate the feed into a first permeate stream in line 30 and a first retentate stream in line 20. The pressure of the feed in line 10 before passing the mixture of gases to the two-step membrane system may be more than about 7000 kPa. The pressure of the first permeate stream in line 30 from the first membrane section 100 is not more than about 13000 kPa and preferably not more than 7000 kPa lower than the pressure of the feed before passing the mixture of gases to the membrane system. The two-step membrane system comprises at least one glassy polymer. The first membrane section may be made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles, polytriazoles, poly(benzimidazole)s and polycarbodiimides.

The first retentate stream in line 20 is passed to the second membrane section 200 within the two-step membrane system to separate the first retentate stream in line 20 into a second permeate stream in line 40 and a second retentate stream in line 50. The pressure of the first retentate stream in line 20 entering the second membrane section is more than about 10000 kPa and preferably more than about 7000 kPa. The pressure of the second permeate stream in line 40 from the second membrane section 200 is not more than about 10000 kPa and preferably not more than about 7000 kPa lower than the pressure of the first retentate stream in line 20. The second membrane section may be made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles, polytriazoles, poly(benzimidazole)s and polycarbodiimides. The first and second membrane section may be made from a variety of polymeric structures. The two-step membrane system may comprise a first membrane and a second membrane made of a same material. The two-step membrane system may comprise a first membrane and a second membrane made of a different material. The size and thickness of the first membrane may be varied depending on the design and requirements. Any type of membrane may be used with the subject invention.

The first permeate stream in line 30 and the second permeate stream in line 40 may comprise waste gases and the first retentate stream in line 20 and the second retentate stream in line 50 may comprise product gases. The first permeate stream in line 30 and the second permeate stream in line 40 may comprise product gases and the first retentate stream in line 20 and the second retentate stream in line 50 may comprise waste gases. The first permeate stream in line 30 is at a different pressure than the second permeate stream in line 40. The second permeate stream in line 40 from the second membrane section 200 may be at higher pressure than the first permeate stream in line 30 from the first membrane section 100. The first permeate stream in line 30 and second permeate stream in line 40 are passed to an ejector 300 to use a higher permeate gas pressure to increase a lower permeate gas pressure. The ejector is configured to increase the pressure of a lower permeate using the energy from a higher permeate gas pressure. The second permeate gas stream in line 40 at a higher pressure provides energy to drive the ejector and increase the pressure of the first permeate gas stream at a lower pressure.

A combined permeate gas stream in line 60 may be recovered from the ejector 300. The first membrane section 100, second membrane section 200 and the ejector 300 are in series within the two-step membrane system. The ejector allows to decrease the pressure of the second permeate stream in line 40 by about 100 kPa to about 3000 kPa. The reduction of the second permeate gas pressure is made possible by the use of the ejector and the high pressure permeate gas stream, allows to increase the recovery of the product gases from the mixture of gases. The losses of the product gas by using an ejector in series with the two step membrane system may be reduced up to 75%. Therefore, there is increased recovery of the product gases and high purity of product gases in the combined permeate gas stream recovered in line 60. The recovery of the product gas in the permeate gas stream may be about 99.1% and the purity of the product gases in the permeate gas stream may be about 97.5%.

Overall, aspects of the invention are associated with separation of mixture of gases using a two-phase membrane system and an ejector in series with the membrane system which advantageously allows increased recovery and high purity of the product gas streams. The process also allows use of less membrane area, internal energy and reduction in inter-step compression cost. Those having skill in the art will recognize the applicability of the process to more than two membrane sections.

While the subject matter has been described with what are presently considered the preferred embodiments, it is to be understood that the subject matter is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the subject matter is a process for separating a feed comprising a mixture of gases comprising passing said feed to a two-step membrane system to separate the mixture of gases in a first membrane section into a first permeate stream and a first retentate stream; passing said first retentate stream to a second membrane section within said two-step membrane system to separate said first retentate stream into a second permeate stream and a second retentate stream; passing the first permeate stream and second permeate stream to an ejector to use a higher permeate gas pressure to increase a lower permeate gas pressure; recovering a combined permeate gas stream from the ejector; and wherein the first membrane section, the second membrane section and the ejector are in series. An embodiment of the invention is one, any or all of prior embodiments in this paragraph up through the first embodiment in this paragraph wherein the first permeate stream and the second permeate stream comprise waste gases and the first retentate stream and the second retentate stream comprise product gases. An embodiment of the invention is one, any or all of prior embodiments in this paragraph up through the first embodiment in this paragraph wherein the first permeate stream and the second permeate stream comprise product gases and the first retentate stream and the second retentate stream comprise waste gases. An embodiment of the invention is one, any or all of prior embodiments in this paragraph up through the first embodiment in this paragraph wherein the first permeate stream is at a different pressure than the second permeate stream. An embodiment of the invention is one, any or all of prior embodiments in this paragraph up through the first embodiment in this paragraph wherein the second permeate stream from the second membrane section is at higher pressure than the first permeate stream from the first membrane section. An embodiment of the invention is one, any or all of prior embodiments in this paragraph up through the first embodiment in this paragraph wherein the second permeate gas stream at a higher pressure provides energy to drive the ejector and increase the pressure of the first permeate gas stream at a lower pressure. An embodiment of the invention is one, any or all of prior embodiments in this paragraph up through the first embodiment in this paragraph wherein the pressure of the feed before passing the mixture of gases to the two-step membrane system is more than about 7000 kPa. An embodiment of the invention is one, any or all of prior embodiments in this paragraph up through the first embodiment in this paragraph wherein the pressure of the first permeate stream from the first membrane section is not more than about 7000 kPa lower than the pressure of the feed before passing the mixture of gases to the membrane system. An embodiment of the invention is one, any or all of prior embodiments in this paragraph up through the first embodiment in this paragraph wherein the pressure of the first retentate stream entering the second membrane section is more than about 7000 kPa. An embodiment of the invention is one, any or all of prior embodiments in this paragraph up through the first embodiment in this paragraph the pressure of the second permeate stream from the second membrane section is not more than about 7000 kPa lower than the pressure of the first retentate stream. An embodiment of the invention is one, any or all of prior embodiments in this paragraph up through the first embodiment in this paragraph wherein said ejector allows to decrease the pressure of the second permeate stream by about 100 kPa to about 3000 kPa. An embodiment of the invention is one, any or all of prior embodiments in this paragraph up through the first embodiment in this paragraph wherein said two-step membrane system comprises a first membrane and a second membrane made of a same material. An embodiment of the invention is one, any or all of prior embodiments in this paragraph up through the first embodiment in this paragraph wherein said two-step membrane system comprises a first membrane and a second membrane made of a different material. An embodiment of the invention is one, any or all of prior embodiments in this paragraph up through the first embodiment in this paragraph wherein said first membrane section is made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles, polytriazoles, poly(benzimidazole)s and polycarbodiimides. An embodiment of the invention is one, any or all of prior embodiments in this paragraph up through the first embodiment in this paragraph wherein said second membrane section is made from substituted or unsubstituted glassy polymers selected from the group comprising of polysulfones, sulfonated polysulfones, polyethersulfones (PESs), sulfonated PESs. polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles, polytriazoles, poly(benzimidazole)s and polycarbodiimides.

A second embodiment of the invention is a two-step membrane-system for separation of mixtures of gases comprising a first membrane section and a second membrane section within the two-step membrane system; the membrane system comprises at least one glassy polymer and wherein a gas mixture is separated into a first retentate stream and a first permeate stream in the first membrane section and into a second retentate stream and a second permeate stream in the second membrane section; an ejector configured to increase the pressure of a lower permeate using the energy from a higher permeate gas pressure; and wherein the first membrane section, second membrane section and the ejector are in series within the two-step membrane system. An embodiment of the invention is one, any or all of prior embodiments in this paragraph up through the second embodiment in this paragraph wherein said two-step membrane system comprises a first membrane and a second membrane made of different material. An embodiment of the invention is one, any or all of prior embodiments in this paragraph up through the second embodiment in this paragraph wherein said two-step membrane system comprises a first membrane and a second membrane made of same material. An embodiment of the invention is one, any or all of prior embodiments in this paragraph up through the second embodiment in this paragraph wherein said first membrane section is made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide); poly(benzobenzimidazole)s, polybenzoxazoles, polyhydrazides, polyoxadiazoles, polytriazoles, poly(benzimidazole)s and polycarbodiimides. An embodiment of the invention is one, any or all of prior embodiments in this paragraph up through the second embodiment in this paragraph wherein said second membrane section is made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles; polytriazoles, poly(benzimidazole)s and polycarbodiimides.

Without further elaboration, it is believed that using the preceding description that one skilled in the art can utilize the present subject matter to its fullest extent and easily ascertain the essential characteristics of this subject matter, without departing from the spirit and scope thereof, to make various changes and modifications of the subject matter and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for separating a feed comprising a mixture of gases comprising:

passing said feed to a two-step membrane system to separate the mixture of gases in a first membrane section into a first permeate stream and a first retentate stream;

passing said first retentate stream to a second membrane section within said two-step membrane system to separate said first retentate stream into a second permeate stream and a second retentate stream;

passing the first permeate stream and second permeate stream to an ejector to use a higher permeate gas pressure to increase a lower permeate gas pressure, wherein said first permeate stream and said second permeate stream pass through the same ejector; and recovering a combined permeate gas stream from the ejector, wherein the first membrane section, the second membrane section and the ejector are in series.

2. The process of claim 1 wherein the first permeate stream and the second permeate stream comprise waste gases and the first retentate stream and the second retentate stream comprise product gases.

3. The process of claim 1 wherein the first permeate stream and the second permeate stream comprise product gases and the first retentate stream and the second retentate stream comprise waste gases.

4. The process of claim 1 wherein the first permeate stream is at a different pressure than the second permeate stream.

5. The process of claim 4 wherein the second permeate stream from the second membrane section is at higher pressure than the first permeate stream from the first membrane section.

6. The process of claim 5 wherein the second permeate stream at a higher pressure provides energy to drive the ejector and increase the pressure of the first permeate stream at a lower pressure.

7. The process of claim 1 wherein the pressure of the feed before passing the mixture of gases to the two-step membrane system is more than about 7000 kPa.

8. The process of claim 1 wherein the pressure of the first permeate stream from the first membrane section is not more than about 7000 kPa lower than the pressure of the feed before passing the mixture of gases to the membrane system.

9. The process of claim 1 wherein the pressure of the first retentate stream entering the second membrane section is more than about 7000 kPa.

10. The process of claim 1 wherein the pressure of the second permeate stream from the second membrane section is not more than about 7000 kPa lower than the pressure of the first retentate stream.

11. The process of claim 1 wherein said ejector allows to decrease the pressure of the second permeate stream by about 100 kPa to about 3000 kPa.

12. The process of claim 1 wherein said two-step membrane system comprises a first membrane and a second membrane made of a same material.

13. The process of claim 1 wherein said two-step membrane system comprises a first membrane and a second membrane made of a different material.

14. The process of claim 1 wherein said first membrane section is made from substituted or unsubstituted glassy polymers selected from the group comprising of polysulfones, sulfonated polysulfones, polyethersulfones, sulfonated polyethersulfones, polyethers, polyetherimides, polycarbonates, cellulosic polymers, polyamides; polyimides, polyamide/imides, polyketones, polyether ketones, poly(arylene oxides), poly(benzobenzimidazole)s, polybenzoxazoles, polyhydrazides, polyoxadiazoles, polytriazoles, poly(benzimidazole)s and polycarbodiimides.

15. The process of claim 1 wherein said second membrane section is made from substituted or unsubstituted glassy polymers selected from the group comprising of polysulfones, sulfonated polysulfones, polyethersulfones, sulfonated polyethersulfones, polyethers, polyetherimides, polycarbonates, cellulosic polymers, polyamides, polyimides, polyamide/imides, polyketones, polyether ketones, poly(arylene oxides), poly(benzobenzimidazole)s, polybenzoxazoles, polyhydrazides, polyoxadiazoles, polytriazoles, poly(benzimidazole)s and polycarbodiimides.

16. A two-step membrane-system for separation of mixtures of gases comprising:
a first membrane section and a second membrane section within the two-step membrane system;
the membrane system comprises at least one glassy polymer and wherein a gas mixture is separated into a first retentate stream and a first permeate stream in the first membrane section and into a second retentate stream and a second permeate stream in the second membrane section; and
an ejector configured to receive said first permeate stream and said second permeate stream and to increase the pressure of a lower permeate using the energy from a higher permeate gas pressure, wherein said first permeate stream and said second permeate stream pass through the same ejector,
wherein the first membrane section, second membrane section and the ejector are in series.

17. The system of claim 16 wherein said two-step membrane system comprises a first membrane and a second membrane made of different material.

18. The system of claim 16 wherein said two-step membrane system comprises a first membrane and a second membrane made of same material.

19. The system of claim 16 wherein said first membrane section is made from substituted or unsubstituted glassy polymers selected from the group comprising of polysulfones, sulfonated polysulfones, polyethersulfones, sulfonated polyethersulfones, polyethers, polyetherimides, polycarbonates, cellulosic polymers, polyamides, polyimides, polyamide/imides, polyketones, polyether ketones, poly(arylene oxides) such as poly(phenylene oxide) and poly(xylene oxide); poly(benzobenzimidazole)s, polybenzoxazoles, polyhydrazides, polyoxadiazoles, polytriazoles, poly(benzimidazole)s and polycarbodiimides.

20. The system of claim 16 wherein said second membrane section is made from substituted or unsubstituted glassy polymers selected from the group comprising of polysulfones, sulfonated polysulfones, polyethersulfones (PESs), sulfonated PESs, polyethers, polyetherimides, polycarbonates, cellulosic polymers, such as cellulose acetate, cellulose triacetate, cellulose acetate-butyrate, cellulose propionate, ethyl cellulose, methyl cellulose, nitrocellulose, polyamides, polyimides, polyamide/imides, polyketones, polyether ketones, poly(arylene oxides) such as poly(phenylene oxide) and poly(xylene oxide), poly(benzobenzimidazole)s, polybenzoxazoles, polyhydrazides, polyoxadiazoles; polytriazoles, poly(benzimidazole)s and polycarbodiimides.

* * * * *